United States Patent [19]

Grangeat et al.

[11] Patent Number: 6,103,350
[45] Date of Patent: *Aug. 15, 2000

[54] PROCESS FOR PRODUCING A RESTORED SEQUENCE OF IMAGES OF A MOVING OBJECT FROM NOISY MEASUREMENTS

[75] Inventors: Pierre Grangeat, Saint Ismier; Jérôme De Murcia, Lyons, both of France

[73] Assignee: Comissariat a l'Energie Atomique, France

[*] Notice: This patent issued on a continued prosecution application filed under 37 CFR 1.53(d), and is subject to the twenty year patent term provisions of 35 U.S.C. 154(a)(2).

[21] Appl. No.: 08/870,971

[22] Filed: Jun. 6, 1997

[30] Foreign Application Priority Data

Jun. 18, 1996 [FR] France .................................. 96 07552

[51] Int. Cl.$^7$ ...................................................... B32B 27/14
[52] U.S. Cl. ......................... 428/195; 351/205; 351/206; 351/214; 351/221
[58] Field of Search ..................................... 428/198, 195; 351/205, 206, 214, 221

[56] References Cited

FOREIGN PATENT DOCUMENTS

0512422A2  3/1992  European Pat. Off. .

OTHER PUBLICATIONS

Adaptive Motion—Compensated Filt. of Noisy Images Sequences, "Modified Sequences" Systems for Video Technology, Aug. 3, 1993 No. 4, NY US.

*Primary Examiner*—Merrick Dixon
*Attorney, Agent, or Firm*—Hayes, Soloway, Hennessey, Grossman & Hage, PC

[57] ABSTRACT

The present invention consists of obtaining from a series of measurements or original images of varying precision of a mobile object, such as a beating heart, a sequence of restored images minimizing an error function comprising an adequation term between the restored images and the measurements, a space moving term of images to be restored and a time smoothing term of restored images, taking account of an evaluation of the movement of the object between the original image during the considered phase of the movement and the image of the object in a neighboring phase.

6 Claims, 6 Drawing Sheets

PROCESS FOR PRODUCING A RESTORED SEQUENCE OF IMAGES OF A MOVING OBJECT FROM NOISY MEASUREMENTS

DESCRIPTION

The invention relates to a process for producing a restored sequence of images of a moving object from noisy measurements.

Such images can be of various types, namely video, radiological or tomographic. This implies that the initially available informations will also be of different natures, because they could be initial bidimensional or three-dimensional images of the object, or projections of radiation emitted by the object or conversely absorbed in the object on a bidimensional detector network. In the latter case, the informations are measurements collected by the detectors, namely sums of the property of the object visualized on images along lines leading to detectors and the restoration of images must be preceded by an image reconstruction using a measurement inversion algorithm for constructing original images of the object.

However, in all cases, the measurement acquisition system subjects the informations which it receives to noise, which deteriorates the images which it gives. The deterioration is greater in the case of a deformation-accompanied or solid body moving object, because a kinetic blur is then produced. The noise of the measurements can often be reduced by increasing the exposure time, but the kinetic blur increases. The process proposed here aims at reducing the deterioration of the measurements by reducing the exposure time, but carrying out a time smoothing on the different measurements taken at different phases of the movement of the object, in order to reduce the noise, by means of an evaluation of the object dis- placements.

Several attempts have been made to restore or improve a sequence of images with the aid of processes using a knowledge of the movement of the object. In one of them the images restored are obtained by completing the measurements with informations drawn from an evolution law of the position or shape of the object, said law being fixed by the user. In another process, it is proposed to reconstruct the object by means of original images obtained by each of the phases of the object movement where measurements are made. Then the movements of the object between phases are estimated by modelling and the informations of the original images are combined into a global image taking account of movements of the object up to the considered phase. Reference should be made for further details to French patent applications 2 701 135 and 95 08001 (the latter not yet being published).

The first of these processes imposes an at least approximate preliminary knowledge of the movement and is consequently not always applicable and the validity of the second is based on the precision of the object movement evaluation. However, it has been found that this evaluation is not always very good, particularly between remote phases, to the extent that the incorporation of certain original images, taken at object states differing very greatly from the reference state, would not improve the restoration of the final image and could even spoil it.

The object of the present invention is a process for restoring a sequence of images with the aid of knowledge of the movement of the object, without said movement being evaluated a priori or given by convention, as in the first document. Use is made of a time smoothing, also known as regularization of images, as in the second document, but without being satisfied merely by this, because use is also made of a space smoothing and a measurement data conformity criterion for restoring the image. The joint use of these three means makes it possible to obtain good results without necessarily calling on original images of all the phases of the object for restoring the image at a given phase, which constitutes an important difference compared with the second document.

A favoured application of the present invention is the examination of movements of the heart for medical diagnosis purposes, using conventional measurement methods such as single-photon emission tomography and positon emission tomography, which are at present able to reveal blood perfusion defects following an obstruction of the coronary arteries. However, the method is also suitable for other clinical examinations and applications.

As will become apparent from the remainder of the description, numerous space or time regularization methods have already been proposed, but hitherto only one method exists using both, as in the invention, a restoration of image sequences using both the conformity or adequation criterion between the measurements and the image, a space regularization and a time regularization. This applies to an article by Lalush and Tsui entitled "Space-time Gibbs priors applied to gated spect myocardial perfusion studies" given at a congress in Aix-les-Bains in 1995. However, this method has only been proposed for stationary objects or objects evolving only very slightly in time and the time regularization then consists of mean values between individual measurements on each measurement point. This method is inadequate for objects having a considerable movement such as the cardiac muscle or myocardium.

Thus, the present invention in its most general form relates to a process for the restoration of images of a moving object, comprising the following stages:

obtaining at least one sequence of original images of the moving body by measurements made by detectors,     evaluating a field of displacement of the object by means of the sequence of original images,     modification of the original images in order to obtain restored images applying both an adequation criterion of the restored images to the measurements, a space regularization criterion of the restored images and a time regularization criterion of the sequence of restored images respecting the object field of displacement.

Thus, an essential aspect of the invention is the determination of a field of displacement for the object, in order to supply an approximate image sequence of the object serving as a basis for the adequation criterion of the restored images. In other words, the images are restored taking account of experimentally obtained, approximate images, which can lead to much better results than by simply applying image space and time regularization criteria, which have the main interest of attenuating measurement noise and local defects of the measured image, but can make the restored image less sharp if applied in an exaggerated manner. The adequation criterion for experimental measurements can serve as a moderating criterion thereof. The original image sequence can be taken by the detectors serving to obtain the images to be restored (e.g. radiation detectors in the case of an emitting object) or different detectors (e.g. ultrasonic sensors). The displacement law is not normally a mathematical analytical law, but generally a displacement field of points of the object.

Advantageously, the criteria is expressed in the same number of terms of an error function between the restored images and the measurements corresponding to the associated original images, the error function admitting a minimum corresponding to an ideal restoration.

The invention is described in greater detail hereinafter relative to the attached drawings, wherein show:

FIGS. 5(a) to 5(e) and 6(a) to 6(d) Two band Two series of experimental results.

Figure 2:
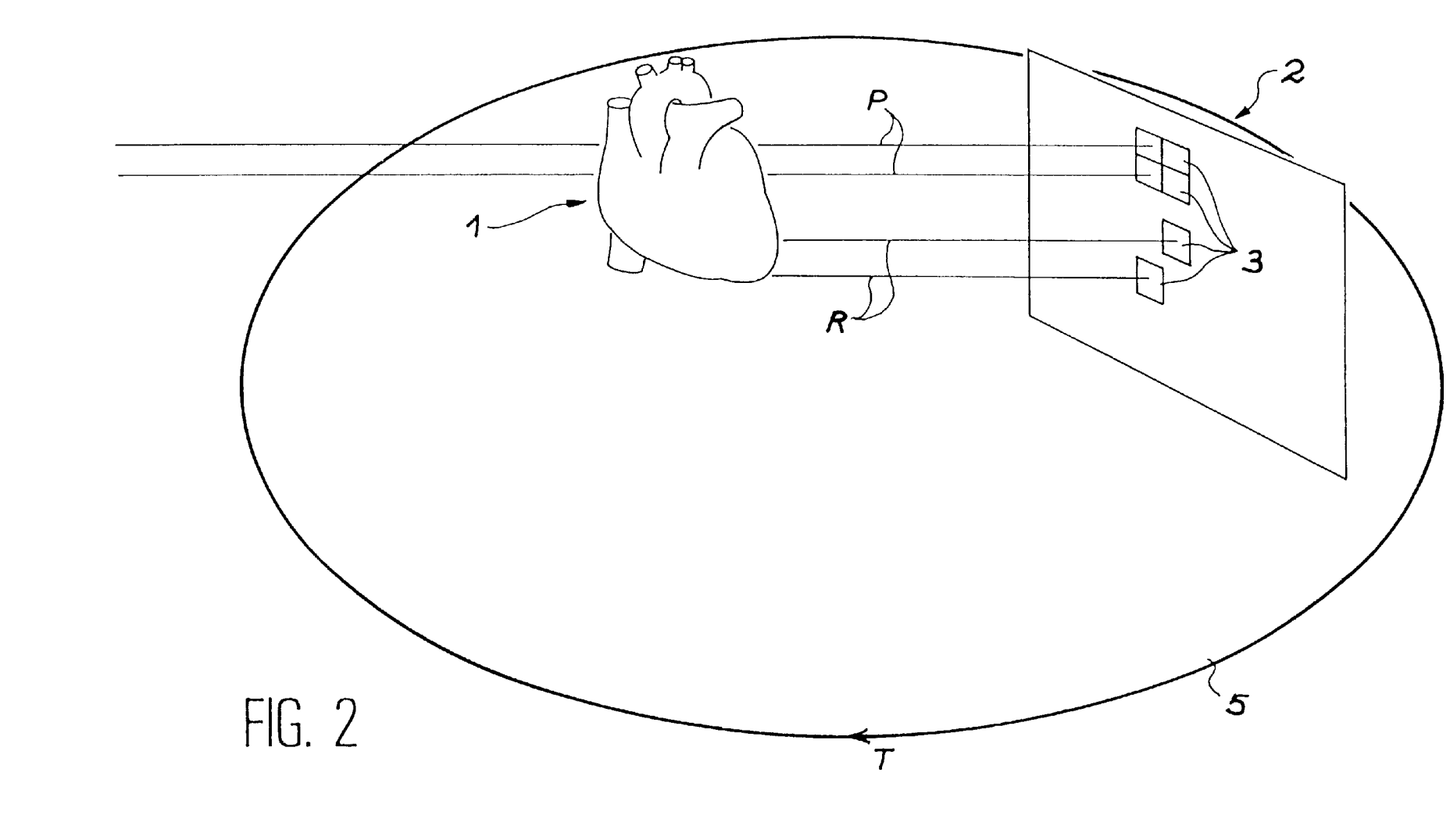
FIG. 2 A diagram of the device for performing the measurements.

We shall consider a plausible case of the use of the invention in which (cf. FIG. 2) the images of the object 1 are restored by a tomographic projection inversion process performed with the aid of a bidimensional network 2 of detectors 3 passing through at least one trajectory T around the object 1. The measurements are here light emission activity measurements (e.g. gamma radiation) of the object along lines R. Measurements are made at different times of the cycle of the object. In order to obtain better measurement statistics, they are repeated over several cycles and, for each instant of the cycle, the acquisitions made in the different cycles are combined. Thus, it is possible to obtain original acquisitions of the object in different considered states, although the restricted information quantity collected at each of these instants renders them imprecise. The three-dimensional original image reconstruction operations are referred to as filtering-back projection operations, i.e. inversions of the projections of the three-dimensional object 1 along lines R on the bidimensional detector network 2. The image restoration proposed here then commences.

If $f_0, f_1, f_2, \ldots, f_{k-1}$ is the property of the object which it is wished to represent on the images for k phases, $m_0, m_1, \ldots, m_{k-1}$ represent all the corresponding measurements made by the detectors respectively for each of the object states during these phases, it is possible to write the following equations (1) assuming that the measurements are acquired in the same way for each of the images:

$$m_0 = Rf_0 \qquad (1)$$
$$\vdots$$
$$m_{k-1} = Rf_{k-1}$$

For each state k, it is possible to have L groups of projections of M rows and M columns of detectors, i.e. the matrixes $m_0, M_1, \ldots, m_{k-1}$ are of dimension $LM^2 \times 1$. The matrixes $f_0, f_1, \ldots, f_{k-1}$ can be of dimension $M^3 \times 1$, if the object and its surroundings are modelled in the form of a cubic volume of M side points. The matrix R is a projection matrix.

All these equations (1) can be expressed by a single equation (2)

$$M = \mathcal{R}F \qquad (2)$$

putting: $M = \begin{pmatrix} m_0 \\ \vdots \\ m_{k-1} \end{pmatrix}, F = \begin{pmatrix} f_0 \\ \vdots \\ f_{k-1} \end{pmatrix}$ and $\mathcal{R} = \begin{pmatrix} R & \cdots & 0 \\ \vdots & \ddots & \vdots \\ 0 & \cdots & r \end{pmatrix}.$ (3)

The problem of reconstructing approximate original images without any type of restoration amounts to the resolution of equation (2) by an inversion of the matrix R for each state. The object of the invention is to improve the quality of the thus obtained images by means of processes which will be described hereinafter. In the case where the images are not obtained by tomography, the problem could be posed in an analogous manner, the matrix R e.g. representing the impulse response of the detector.

The restoration of the image can be symbolized in terms of probabilities composed by the equation (4) taking the terms M and F of equation (3):

$$\hat{F} = \underset{F}{\mathrm{argmax}} \{\ln p(M/F) + \ln p(F)\} \qquad (4)$$

where $\hat{F}$ represents the restored image, p(F) represents the probability of an image and p(M/F) represents the probability of an image correlated with the actually obtained measurements M. The restored image $\hat{F}$ will be the image F for which the sum $\{\ln\ p(M/F) + \ln\ p(F)\}$ is the highest. Specifically, ln p(M/F) will be high if $\hat{F}$ is an almost exact solution of equation M=R $\hat{F}$, within minor imprecisions, and ln p(F) will be high if e.g. the image of the object has an expected form or if the aspect of the object remains roughly the same between phases, the image F considered here combining all the object examination phases. Thus, there are three criteria for assessing the quality of an image and aiding in its restoration, namely the adequation with respect to the measurements, the space coherence and the time coherence. These criteria are effectively used in the present process and will be explained hereinafter.

In an equivalent manner to equation (4), it is then possible to write equation (5):

$$\hat{F} = \underset{F}{\mathrm{argmin}} J/F) \qquad (5)$$

where J(F) is a function formed by three terms (6):

$$J(F) = J_1(F) + \alpha J_2(F) + \beta J_3(F) \qquad (6)$$

and where the different terms $J_1, J_2, J_3$ can be expressed by the equations (7):

$$J_1(F) = \sum_{k=0}^{k-1} J_m(m_k, f_k) \qquad (7)$$

where: $J_s(m_k, f_k) = \ln p(m_k/f_k)$ $$J_2(F) = \sum_{k=0}^{k-1} J_s(f_k)$$

where: $J_s(f_k) = \ln p(f_k)$ $$J_3(F) = \sum_{k \neq k'} J_c(f_k, f_{k'})$$

where: $J_t(f_k, f_{k'}) = \ln p(f_k/f_{k'})$, the coefficients α and β being weighting constants expressing the significance given to each of these terms.

Thus, the term $J_1$ corresponds to the term p(M/F) and expresses the adequation between the estimated image and the measurements, whereas both of the terms $J_1$ and $J_3$ belong to the quantity p(F) and express the space probability and time probability of the estimated image.

In the preferred implementation form of the invention, the proposal is to choose the adequation term at data $J_1(F)$ in the form of equations (8):

$$J_1(F) = \sum_{k=0}^{k-1} J_m(m_k, f_k) \qquad (8)$$

where $$J_m(m_k, f_k) = \|m_k - Rf_k\|^2.$$

By examining equations (8) it can be seen that a comparison is made between the measurements effectively obtained for each of the detectors 3 and each of the phases k and measurements which would have been obtained with detectors 3 placed at the same locations assuming that the estimate $\hat{F}$ is the real image. This amounts to comparing bidimensional projections of the restored images with bidimensional measurements.

For the space regularization term, it is possible to choose equation (9):

$$J_2(F) = \sum_{k=0}^{k-1} J_s(f_k) \qquad (9)$$

where $$J_s(f_k) = \|\Delta f_k\|^2,$$

$\Delta f_k$ representing the three-dimensional laplacian of $f_k$. This is a softness constraint rejecting as improbable excessively rapid variations in space of the function $f_k$. The use of this criterion makes it possible to obtain restored images, whose overall form or shape is faithfully rendered, but whose contours are smoothed.

With regards to the time regularization, it is possible to estimate that the evolution of the activity of the object or more generally the measured property satisfies the continuity equation in time:

$$\frac{\partial f}{\partial t} + \nabla \cdot (f \cdot v) = 0 \qquad (10)$$

in which $\nabla$ represents the divergence operator and v the velocity field of different points of the object. If it is assumed that the object is incompressible, the continuity equation is written in accordance with (11):

$$\frac{\partial f}{\partial t} + v \cdot \nabla(f) = 0 \qquad (11)$$

which is equivalent to saying that the activity of a material point of the object is constant along its trajectory. It is then possible to write equation (12):

$$f_k(i) = f_{k'}(i + d_{k,k'}(i)) \qquad (12)$$

where $d_{k,k'}(i)$ is the displacement of the point i between phases k and k'.

Generally, the resultant point of the displacement of point i at the instant of the phase k is not placed on a modelling point of the object 1 at the instant of the phase k', which imposes estimating $f_{k'}(i+d_{k,k'}(i))$ by an interpolation, e.g. to the closest neighbouring point j of the voxel-discretized image.

The time regularization criterion finally retained can be expressed by equations (13) and (14):

$$J_3(F) = \sum_{k=0}^{k-1} \sum_{k' \in V_k} J_c(f_k, f_{k'}) \qquad (13)$$

$$J_t(f_{k'}, f_k) = \sum_i w_{k,k'}(i)(f_k(i) - f_{k'}(i + d_{k,k'}(i)))^2. \qquad (14)$$

$V_k$ designating an adjacency of phases, which signifies that for each phase the displacements of the points of the image are only followed over a portion of the other phases, and optionally only between individual phases for carrying out the regularization. In an advantageous mode, $V_k$ is reduced to k−1 and consequently $$J_3(F) = \sum_{k=0}^{k-1} J_k(f_k, f_{k-1}) \text{ and } f_{-1} = f_{kl}.$$

In another advantageous mode, there is a limitation to the phases k−1 and k+1. The coefficients $W_{k,k'}(i)$ are weighting coefficients of the quantities taken into account for the regularization, i.e. confidence coefficients in the informations which they can supply.

Figures 3, 4:
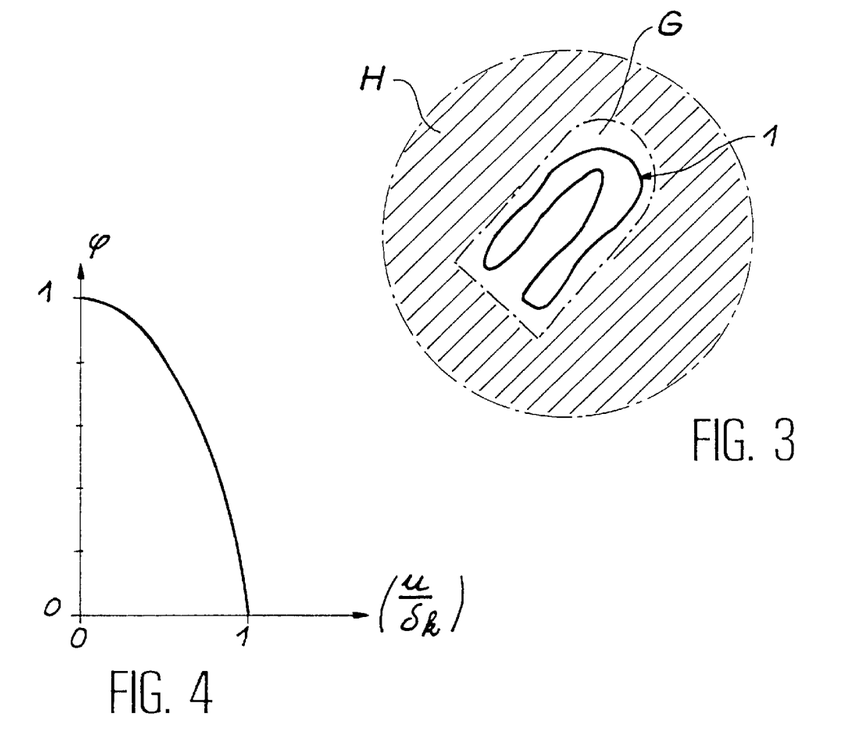
FIG. 3 An image representation for explaining the time regularization
FIG. 4 A curve of a function used in time regularization.

These coefficients $W_{k,k'}(i)$ are chosen equal to 1 for the image background H (cf. FIG. 3), i.e. for points surrounding the object at a certain distance and assumed to be stationary. For other points of the image, i.e. the actual object and the immediately adjacent area G, the coefficients $W_{k,k'}(i)$ are given by the equation (15):

$$w_{k,k'}(i) = \phi_{k,k'}(\tilde{f}_k(i) - \tilde{f}_{k'}(i + d_{k,k'}(i))) \qquad (15)$$

where $\tilde{f}_k$ designates the original image constructed for the phase k and $\phi_k(u)$ is given by the equation (16):

$$\varphi_{k,k'}(u) = \max\left\{0, 1 - \left(\frac{u}{\delta_{k,k'}}\right)^2\right\} \qquad (16)$$

in which $\delta_{k,k'}$ is a fixed coefficient expressing the distance from which the comparison between $f_k(i)$ and $f_k(i+d_{k,k'}(i))$ is no longer considered. FIG. 4 shows the function obtained.

It is a threshold making it possible to reject the points associated with false displacements. $\delta_{K,k'}$ can be chosen equal to the standard deviation of the distribution of the activity of the voxels contained in the envelope model relative to phase k. This envelope model is obtained by homothetic transformation of the surface $S_B$, defined hereinafter, used for evaluating the movement accompanied by deformations of the object 1.

Figure 1:
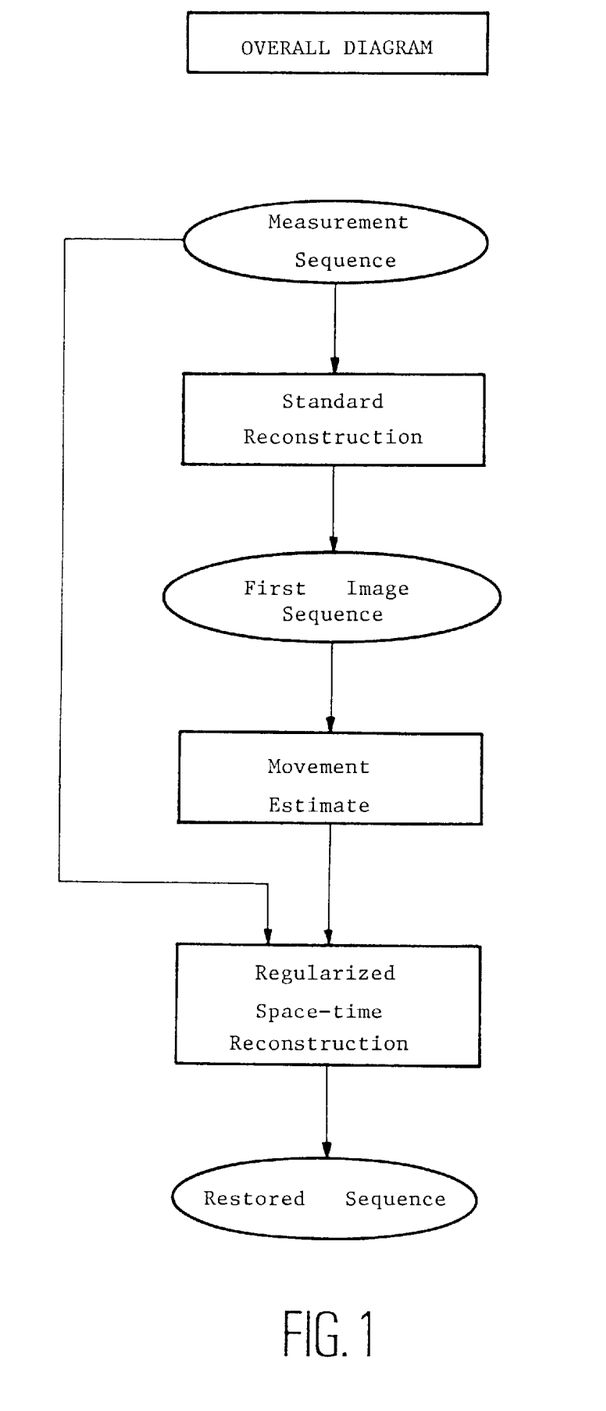
FIG. 1 A general flow chart of the process.

Thus, the estimate $\hat{F}$ is defined as the minimum of the function J(F) such that:

$$J(F) = \sum_{k=0}^{K-1} J_{m,mk}(f_k) + \sum_{k=0}^{K-1} J_s(f_k) + \sum_{k=0}^{K-1} J_t(f_{k-1}) \qquad (17)$$

which can also be written:

$$J(F) = F^t R^t R F + \alpha F^t C_s F + \beta F^t C_t F \qquad (18)$$

where $C_s$ and $C_t$ are matrixes representing the space and time constraints and $\alpha$ and $\beta$ are weighting coefficients for adjusting the significance of the terms. FIG. 1 summarizes the flow chart of the invention.

It is possible to theoretically calculate $\hat{F}$ by:

$$\hat{F} = (R^t R + \alpha C_s + \beta C_t)^{-1} R^t M \qquad (19)$$

but the matrix $(R^tR+\alpha C_s+\beta C_t)$ cannot be directly reversed due to its excessive dimensions. Thus, choice is made of an iterative method for calculating $\hat{F}$.

The function J(F) is quadratic and can be expressed in the form of equation (20):

$$J(x) = \frac{1}{2}x^tAx + b^tx + c \tag{20}$$

where A is a square, symmetrical matrix defined in positive form, x and b being vectors and c a scalar quantity. Use is made of a gradient descent method (inspired by the word of Ciarlet "Introduction a l'analyse numérique matricielle et à l'optimisation", Masson, 1982) starting with an arbitrary vector $x_0$ in order to obtain a sequence of vectors $x_n$. This sequence converges towards the solution as a result of the quadratic character of the function J(x), which only admits a minimum. The term $x_{n+1}$ is found by solving the equation (21):

$$x_{n+1}=x_n+\alpha_n d_n \tag{21}$$

where $d_n$ is a descent direction coefficient calculated on the basis of the gradient of J in $x_n$. The method giving the fastest convergence is the conjugate gradient method, for which $d_n$ is chosen such that $d_{n+1}{}^tAd_n=0$ for each iteration. The convergence is assured in N iterations at the most if N is the dimension of the vector x. The following formulas (22) update the gradient:

$$\begin{aligned}
d_0 &= r_0 = b - Ax_0 \\
\alpha_{n+1} &= \frac{r_n^t r_n}{d_n^t A d_n} \\
x_{n+1} &= x_n + \alpha_n d_n \\
r_{n+1} &= r_n - \alpha_n d_n \\
\beta_{n+1} &= \frac{r_{n+1}^t r_{n+1}}{r_n^t r_n} \\
d_{n+1} &= r_{n+1} + \beta_{n+1} d_n
\end{aligned} \tag{22}$$

In the present case, it is possible to set the identities (23):

$$\begin{aligned}
A &= \mathcal{R}^t\mathcal{R} + \alpha C_s + \beta C_t \\
b &= \mathcal{R}^t M \\
c &= \tfrac{1}{2} M^t M
\end{aligned} \tag{23}$$

Thus, by means of this equation (18) is solved. In practice, the vectors $x_n$, $r_n$, $d_n$ and $Ad_n$ are calculated and stored for each iteration. Thus, the operations comprise multiplications of R, $R^t$, $C_s$ and $C_t$ by $d_n$. R and $R^t$ consist of projections and back projections of the image of the object. The matrix $C_s$ is equal to L.L, where L is the operator matrix of the laplacian of each image of the sequence. The laplacian of a three-dimensional image is defined by equation (4) for each of the points (l, p, q) of said image:

$$\Delta f(l,p,q)=f(l+1,p,q)+f(l,p+1,q)+f(l,p,q+1)+f(l-1,p,q)+f(l,p-1,q)+f(l,p,q-1)-6f(l,p,q) \tag{24}$$

Finally, the multiplication of a vector G representing a three-dimensional image sequence by the matrix $C_t$ amounts to performing the following operation (25) for each point defined by a space index i and a time index k:

$$C_tG(i,k)=w_{k,k'}(i)g_k(i)-w_{k,k'}(i)g_{k-1}(i+d_k(i))-w_{k,k'}(i)g_{k+1}(i)+w_{k,k'}(j)g_{k+1}(i+d_{k+1}(j)) \tag{25}$$

where j is the position such that $j+d_{k+1}(j)=i$.

The iterative process can be initialized by a zero activity sequence of the object or by a sequence reconstructed on the basis of measurements, by filtering and back projection. The process can be stopped after a fixed number of iterations or when the visualized sequence obtained is considered to be appropriate by the operator, or as a function of an automatic criterion.

For each iteration, the confidence coefficients must be recalculated according to formula (26) drawn from formula (19):

$$w_{k,k'}{}^n(i)=\varphi_{,kk}(\hat{f}_k^{n-1}(i)-\hat{f}_{k-1k-1}(i+d_k(i))) \tag{26}$$

Finally, on admitting that the minimization of J(F) is equivalent to the resolution of equation (27):

$$HF=M, \tag{27}$$

where $H=R^tR+\alpha C_s+\beta C_t$
the problem is equivalent to equation (28):

$$PHF=PM \tag{28}$$

where P is a preconditioning matrix by diagonal matrix or filter, whose aim is to speed up the convergence process. Several matrixes P have already been proposed in the prior art, so that this calculation preconditioning possibility, which is only optional, is only given for information purposes.

Figure 5:
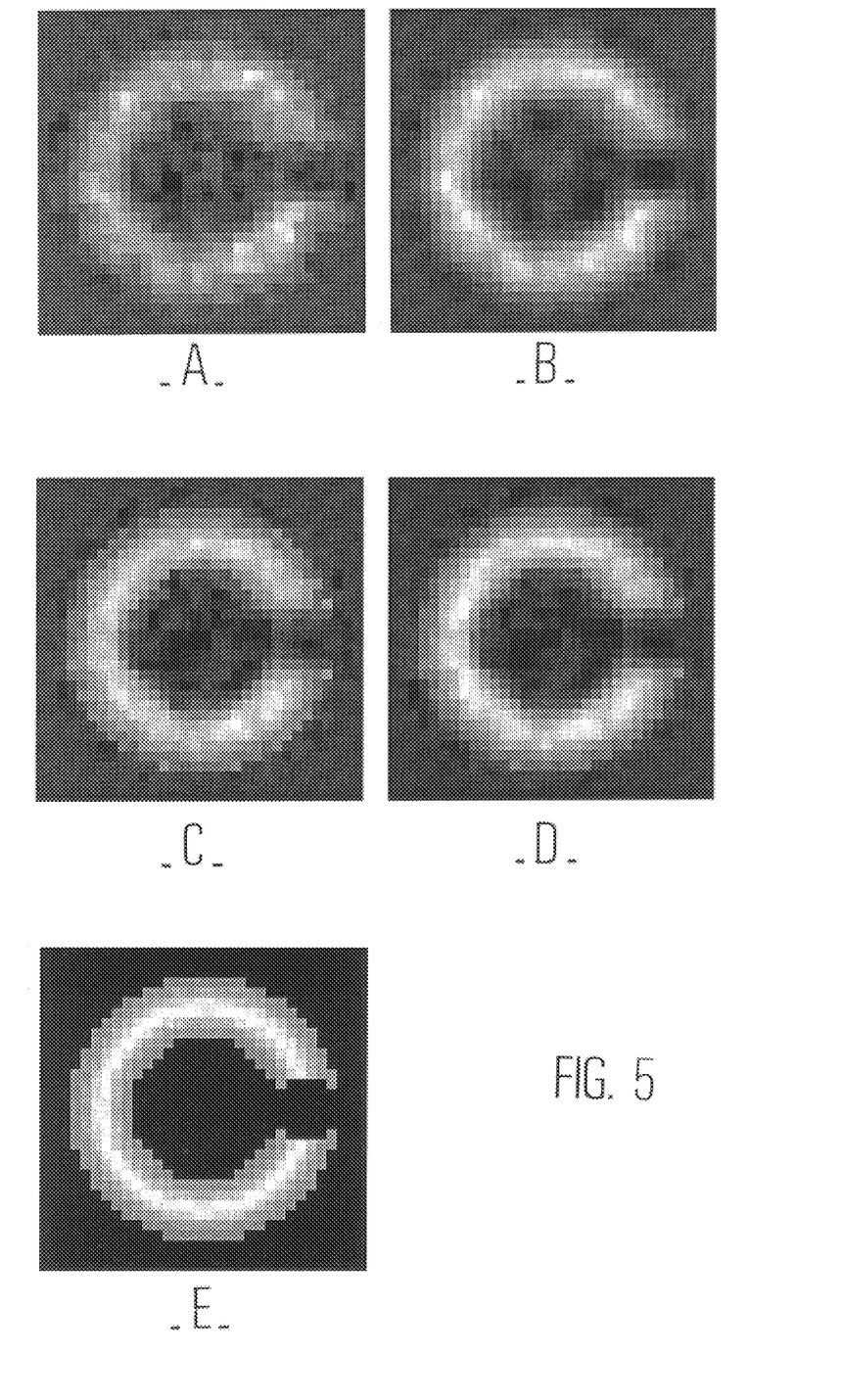

FIG. 5 shows experimental results in which the object is a hollowed out sphere, whose emission activity increases towards a central band, except in a spherical area of zero activity to the right in FIG. 5. As the movement of the object was radial with a zero divergence in order to respect to the incompressibility constraint. The object was modelled in a cube with 32 side points for eight phases simulating a complete cardiac cycle. For each phase, 32 projections of the object distributed over 180° were digitally calculated and deteriorated by a gaussian white noise such that $C_b\sigma^2I$. Apart from the real image, FIG. 5 shows various restored images without and with the invention for the same phase. Two images respectively obtained with a space regularization only (coefficient $\alpha=1$ in FIG. 5b) and a time regularization only (coefficient $\beta=100$, FIG. 5c) are shown. As stated hereinbefore, the first gives an overall, satisfactory form or shape, but a blurred contour, whereas the second gives a sharper contour and a good rendering of the inactive area, but less distinct details, because the distribution of the activity within the object is less well restored. The space-time regularization according to the invention (coefficient $\alpha=0.2$ and $\beta=50$, FIG. 5d) makes it possible to combine the advantages of the two preceding regularizations. With regards to the attempt to reconstruct the image without regularization ($\alpha=0$ and $\beta=0$, FIG. 5a), it leads to the worse results, the images being very disturbed and the contrast with the background decidedly inferior. Moreover, the successively estimated images then converge poorly towards an image estimated as stable, or may not even converge at all. The regularized images converge relatively rapidly towards their stable, estimated image and arrive there roughly after ten or fewer iterations. Convergence is slightly faster for the method according to the invention.

The advantages of the invention are even more clear in certain specific cases, particularly when the object has an irregular shape and occupies a smaller surface on the image.

Figure 6:
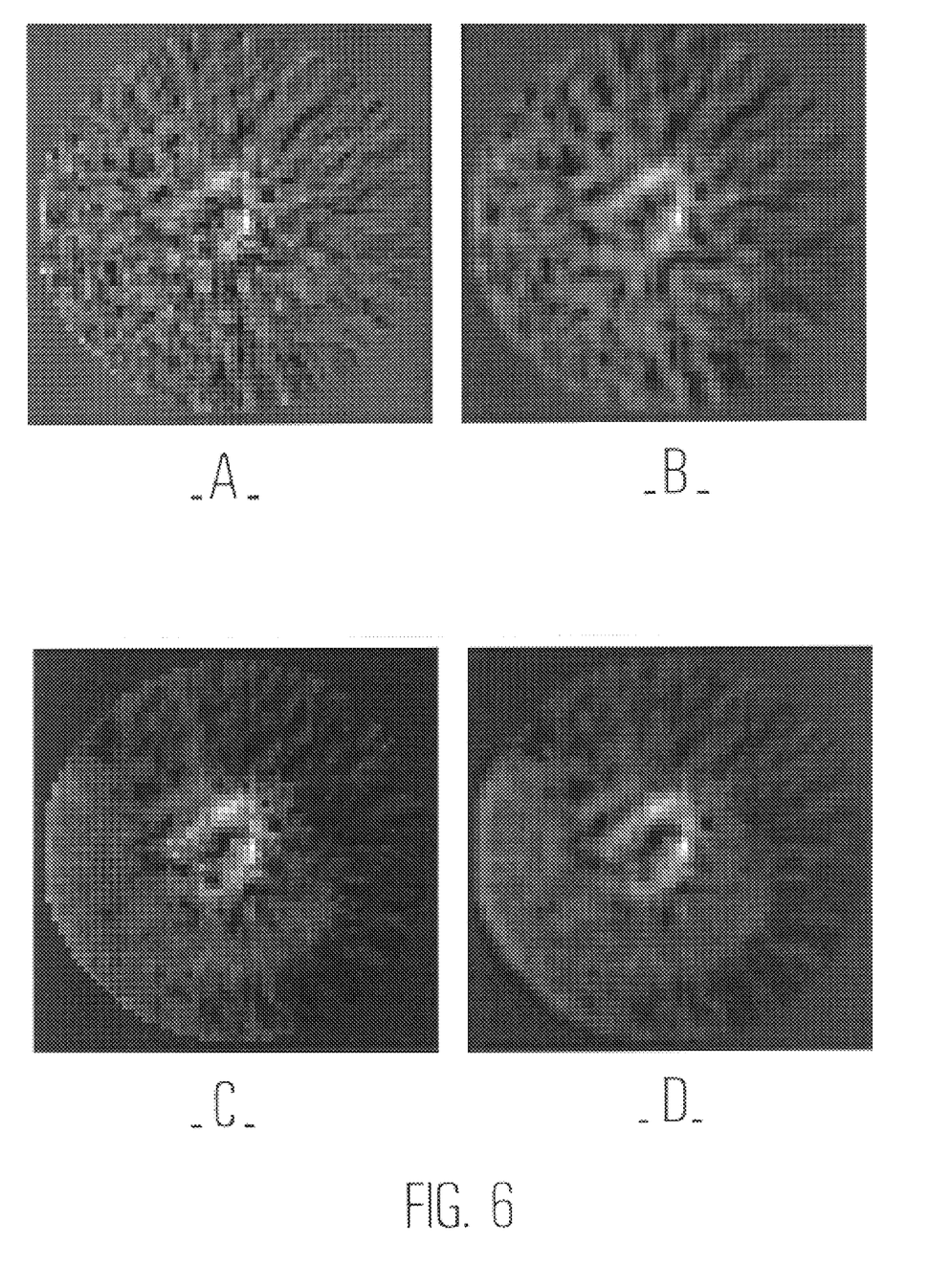

Therefore interest is attached to the restoration of the sequence of images of a myocardium from 16 sets of projections. Each set consisted of 32 projections of 64×64 image points or pixels distributed over 180°. These sixteen projection sets were taken between the diastole and the systole. As can be seen in FIG. 6, which shows a reconstruction without regularization ($\alpha=0$ and $\beta=0$, FIG. 6a), a reconstruciton with space regularization ($\alpha=0.5$, FIG. 6b), a reconstruction with time regularization ($\beta=100$, FIG. 6c) and finally a reconstruction with space-time regularization ($\beta=0.4$ and $\beta=50$, FIG. 6d) according to the invention, the image is virtually unusable in the first case, with a very imprecise surface in the second due to the lack of contrast with the background, whilst details of the object are very poorly rendered in the third. Only the invention offers a good quality image.

A process will now be given for appropriately modelling a myocardium and its movement, on the basis of FIGS. 7 to 9. This process forms part of French patent application 95 08001, where it is described in the same terms and consequently does not form part of the present invention.

In the case where it is only possible to consider that the global emission activity per image remains constant in time, the continuity equation:

$$\frac{\partial f}{\partial t} + \nabla \cdot (f\vec{v}) = 0, \text{ (like equation 10)}$$

frequently encountered in continuum mechanics and fluid mechanics is respected, $f(M,t)$ and $\vec{v}(M,t)$ designating the emission activity density and velocity of the object at a point M and at an instant t. $\nabla$ designates the divergence operator. $V_k$ is the field of movements $\vec{v}_k(M)$ of points M of the object of the original state (k=0) at state k. It is possible to break down this movement by the equation:

$$\vec{v}(M)=\vec{v}(C)+\vec{\Omega}\wedge(C\vec{M})+\vec{D}(M) \qquad (29)$$

where C is the inertia centre of the object (myocardium), $\vec{v}(C)$ and $\vec{\Omega}$ being translation and rotation components of the torsor of the rigid movement field of the object and $\vec{D}(M)$ the non-rigid movement expressed in a reference frame linked with the object, i.e. the actual deformations.

In the case of the myocardium, this reference frame has for its origin and for directional axes the centre C and the major axes of an ellipsoid serving to model the barycentric surface of the myocardium between its internal and external surfaces (endocardium and pericardium). This surface can be defined in spherical coordinates for the heart apex and cylindrical coordinates for the base of the heart. This system of coordinates is designated ($\rho$, $\phi$,.) and the following equation used:

$$\rho G(\phi G, .) = \frac{\int_0^{\rho max} f(\rho, \phi G, .)\rho\, d\rho}{\int_0^{\rho max} f(\rho, \phi G, .)d\rho} \qquad (30)$$

where $a(\rho,\phi G,.)$ designates the emission activity at the coordinate point $f(\rho,\phi G,.)$ and $\rho max$ designates the maximum scanning distance. For any angular coordinate ($\phi G,.$), the point of the barycentric surface consequently has the radial coordinate $\rho G$.

This method appears to be more precise than the others if the heart has a vascularization deficiency and in particular methods based on the seeking of the main inertia moments. Thus, activity deficiencies which then appear can easily disturb the results of the calculations.

Figure 7:
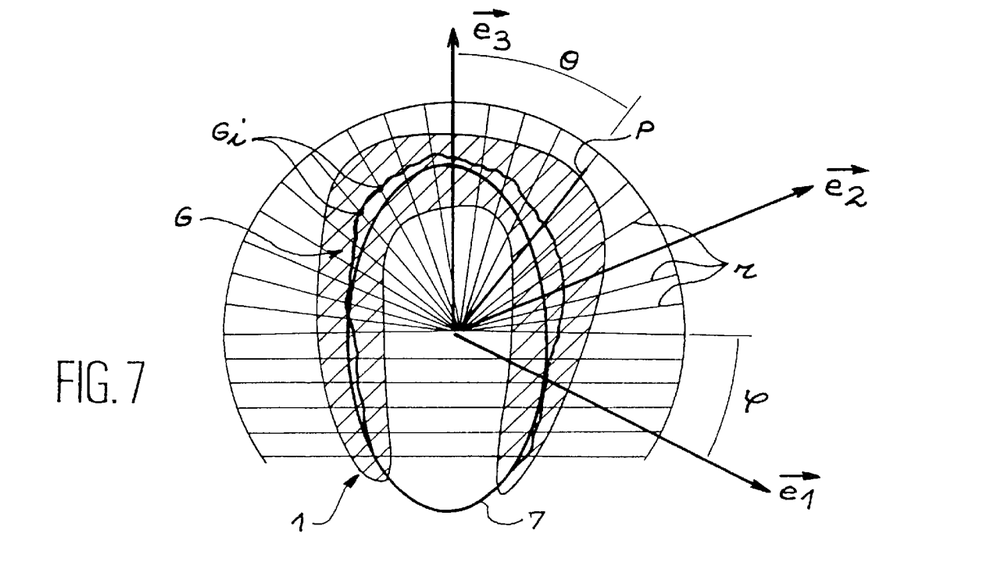
FIGS. 7, 8 & 9 A modelling diagram of the myocardium in cross, longitudinal and perspective sections.
Figure 8:
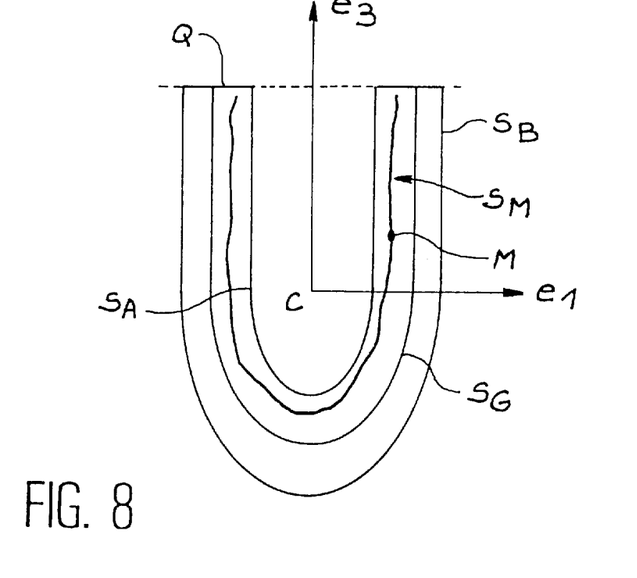

FIG. 7 shows a myocardium in section, the ellipsoid able to model the barycentric surface and the myocardium for the needs of estimating its overall movement and the sampling retained, which is hemispherical on the side of the myocardium apex and cylindrical on the side of its base. For this part, the determination lines of the barycentric surface G are all parallel. These lines along which the points $G_i$ are determined are all designated by r.

Thus, the first stage is to calculate the points Gi of the coordinates $x_i$, $y_i$ and $z_i$ of the barycentric surface G using the formula given hereinbefore, followed by a calculation of the parameters of the ellipsoid 7 closest to this surface, defining the error function:

$$\sum_{i=1}^{N} (1 - \Gamma(x_i, y_i, z_i))^2 \qquad (31)$$

in which N designates the number of points $G_i$ of the barycentric surface G and $\Gamma(x,y,z)$ is the equation of an ellipsoid, namely $$\Gamma(x,y,z)=a_0 x^2+a_1 y^2+a_2 z^2+a_3 xy+a_4 xz+a_5 yz+a_6 x+a_7 y+a_8 z=1 \qquad (32).$$

The system obtained is solved in order to obtain the coefficients $a_0$ to $a_8$ until the minimum of this error function is obtained. A new reference frame is associated with the ellipsoid obtained, which implies other scanning lines and the calculation of coordinates of points $G_i$. In practice, the process is recommenced by successive iterations until the position and orientation variations of the axes of the reference frame associated with the ellipsoid 7 and resulting from the coefficients $a_0$ to $a_8$, become insensitive, bearing in mind the resolution of the image. For the first iteration, the ellipsoid 7 and associated reference frame are obtained by solving the error equation with all the points of the image of the myocardium, in the absence of lines making it possible to calculate a barycentric surface.

The axes shown in FIG. 7 are then obtained. The axis $\vec{e}_3$ is always directed into the major axis of the ellipsoid towards the myocardium apex. The origin C (FIG. 8) is the centre of the ellipsoid.

Once the reference frame has been calculated for the image k, the global translation movement between states 0 and k is defined by the vector $C^0 C^k$ and the rotation matrix is calculated by the product of the components of the two vectors $$[\vec{e}_1^k, \vec{e}_2^k, \vec{e}_3^k]^t \cdot [\vec{e}_1^o, \vec{e}_2^o, \vec{e}_3^o].$$

The non-rigid movement can be estimated from the contours of the myocardium and the barycentric surface G. A less diagrammatic modelling of the myocardium is henceforth used. The endocardium and pericardium are modelled by rifle bullet surfaces, i.e. half-ellipsoids of revolution at the end and cylindrical of revolution at the base. The position of the surfaces is effected by seeking parameters of said surfaces making it possible to maximize the integral on these surfaces of the quadratic norm of the gradient of the emission property. This is due to the fact that as only the organ emits photons, the emission variation is greatest on traversing internal and external surfaces thereof and thus surfaces having a simple shape are sought, which best prove this property. Five parameters are necessary for defining the two rifle bullet surfaces (the height of the cylinders and the measurements of the ellipsoids at the major axes).

On calling a the half-measurement of the ellipsoids along their minor axes (perpendicular to $\vec{e}_3$), c their half-measurement along their major axis $\vec{e}_3$, A the index of the endocardium, B the index of the pericardium and h the height of the cylinders, the calculations are performed by varying $a_A$, $a_B$, $c_B$ and establishment takes place by convention of $c_A = 1.5 a_A$, because it is found that this parameter is difficult to calculate. In the same way, the parameter h can also not be easily directly obtained. For this purpose, the original image $f^{+1}$ is broken down into sections passing through the axis $\vec{e}_3$, where φ is constant and for each of these sections a measurement takes place of the gradient of the activity along the surface between curves $S_A$ and $S_B$ modelling the endocardium and the pericardium. The plane Q where the cylinder stops corresponds to the maximum gradient of the activity, summated for all the sections, all this being shown in FIG. 8.

It is then possible to completely define a modelling $S_G$ of the barycentric surface G, which is a rifle bullet surface defined by the equations:

$$S_G \begin{cases} \Gamma(x, y, z) = a_0 x^2 + a_1 y^2 + a_2 z^2 & \text{if } z \geq 0 \\ \Gamma(x, y, z) = a_0 x^2 + a_1 y^2 & \text{if } -h \leq z \leq 0. \end{cases} \quad (33)$$

With each point M of the myocardium it is possible to make correspond a rifle bullet-shaped surface intermediate between $S_A$ and $S_B$ and defined by new parameters a and c, h remaining identical. After an expansion or contraction deformation, point M relative to phase k, of coordinates x, y and z becomes a point M' relative to phase k' of coordinates x', y' and z' present on a surface of the same shape and defined by the parameters a', c' and h', such that:

$$x'=(a'/a)x, \ y'=(a'/a)y \text{ and } z'=[(c'+h')/(c+h)]z. \quad (34)$$

Figure 9:
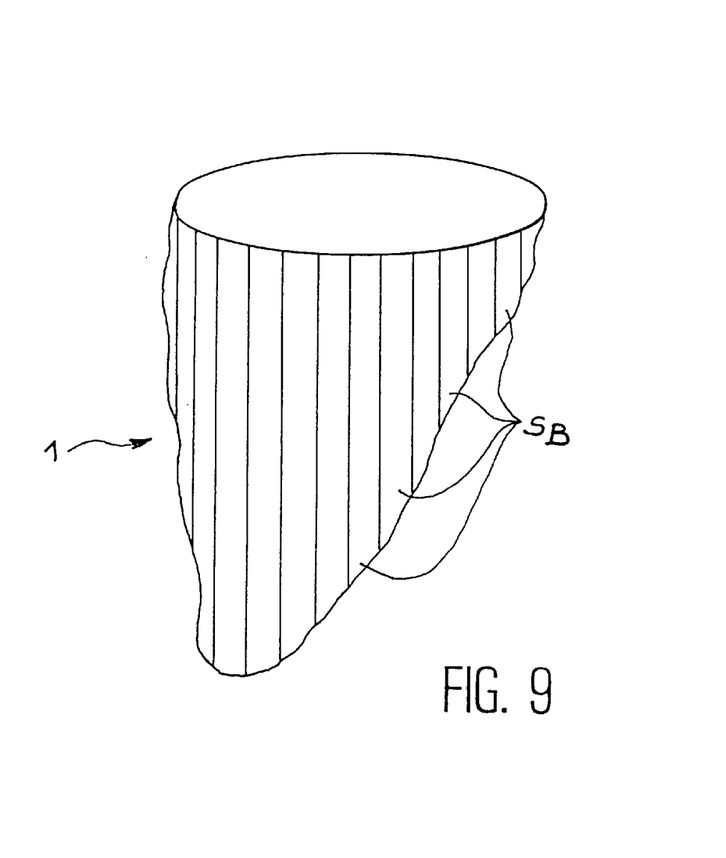

On modelling in the manner illustrated in FIG. 9, the deformed myocardium as a superimposition of segments in the form of unequally expanded rifle bullets, the deformation displacements of point M between states k and k' along the three axes can be expressed by the following formulas:

$$d(M) \begin{cases} d(x) = \left(\dfrac{a'}{a} - 1\right)x \\ d(y) = \left(\dfrac{b'}{b} - 1\right)y \\ d(z) = \left(\dfrac{c'+h'}{c+h} - 1\right)z \end{cases} \quad (35)$$

More specifically, the coefficients a, b and c associated with point M obey proportionality relations with coefficients of the same name of the barycentric surface on the one hand and the surface modelling either the endocardium or the pericardium on the other. The coefficients a', b' and c' associated with the point M' obey the same relations with the coefficients of the same modelling surfaces in the deformed state.

It is necessary to add to these deformations overall displacements in order to obtain the complete movement at each point of the myocardium.

This myocardium modelling has now been explained, so that hereinafter are given some other possibilities for carrying out a space regularization and a time regularization. In all cases, the regularizations can be expressed by mathematical functions, preference being given to quadratic functions, because they only allow one minimum and therefore offer a complete certainty of convergence.

For space regularization, it is possible to operate by comparison between the image f and an image model μ. The function $J_s(f)$ can be the weighted quadratic norm of image f, expressed by the formula (36):

$$J_s(f) = (f-\mu)^t C (f-\mu) \quad (36)$$

where C is a symmetrical matrix defined positive. If C is chosen equal to I, the norm is the euclidean norm (37):

$$J_s(f) = (f-\mu)^t (f-\mu) = \|f-\mu\|^2 \quad (37)$$

Use can also be made of the Kullback-Leibler distance (38), whose interest is to preserve the non-negative character of the activity to be reconstructed:

$$J_s(f) = \sum_{i=1}^{N} \rho_i \ln \frac{f_i}{\mu_i} \quad (38)$$

with (39):

$$\rho_i = \frac{f_i}{\sum_{i=1}^{N} f_i}. \quad (39)$$

In the absence of a reliable model of the image, use can be made of other criteria, such as the softness of the image, whereof a particular case has also been chosen and described hereinbefore as the preferred embodiment of the invention and which can be expressed by the general formula (40):

$$J_s(f) = \|\Delta^n f\|^2 \quad (40)$$

where $\Delta^n f$ is the order n derivative of f. It is also possible to take $J_s(f) = \|Cf\|$, where C is a filtering operator.

The disadvantage of this criterion is that the regularization is accompanied by an obliteration of the contours of the object. Thus, it is possible to propose a more complicated formulation criterion (41):

$$J_s(f) = \sum_i \sum_{j V_i} w_{ij} \varphi(f_i - f_j)^2 \quad (41)$$

where $V_i$ is an adjacency of the point i, $W_{ij}$ a confidence coefficient and φ a continuous even function. It is then possible to choose φ in such a way that the regularization does not take place along the contour of the object, between the object and the exterior, but instead solely within the object. However, such a criterion is complicated to implement and may lead to additional calculations.

Up to now much less attention has been paid to time regularization and the authors are only aware of the following formula (42), extracted from the aforementioned article of Lalush and Tsui:

$$J_t(f_k, f_{k'}) = \sum_{j V_{i,k}} \varphi(f_{i,k} - f_{j,k'}) \quad (42)$$

where f designates the activity of the point i at phase k, $V_{i,k}$ a space-temporal vicinity of said point at said phase (comprising the six points adjacent to the neighbouring phases k−1 and k+1) and φ is again an even function. However, as has been stated, the movement of the object between individual images is not considered in said article.

In the invention described hereinbefore, the displacement field $d_{k,k'}$ is calculated from the sequence of original images. The interest of this approach is that it is autonomous, because it requires no supplementary informations for determining this field. However, it is not very precise, because nuclear imaging is firstly an imaging of biological functions disclosing only few details. Therefore it would be of interest to calculate the displacement field $d_{k,k'}$ from a complimentary image sequence, following an image resetting according to the article "A survey of image registration techniques" by Lisa Gottesfeld Brown, HCM Computing Surveys, vol. 24, No. 4, December 1992, pp 325–376. This supplementary image sequence could result from acquisitions performed either in X-ray imaging, nuclear magnetic resonance imaging, or ultrasonic imaging. The article "Computation of 3-D velocity field from 3-D cine CT images of a human heart" by S. M. Song, R. M. Leahy, IEEE Trans. on Medical Imaging, vol. 10, No. 3, September 1991, pp 296–306 describes the calculation of the displacement field from a sequence of tomographic images of the heart by X-rays. The displacement field $d_{k,k'}$ proposed hereinbefore corresponds to the velocity field of said article.

What is claimed is:

1. A process for restoring images of a moving object, comprising the steps of:

making measurements of a property of the object by detectors at different times;

obtaining a sequence of original images with a reconstruction process from the measurements for each of said different times;

estimating displacements of the object with time in said original images;

improving a sequence of restored images, the restored images being composed of points, a value of the property being associated to each of the points, wherein:

an error function is used, which is a sum of a time regularization term, a space regularization term and a measurements adequation term; for each point of the restored images, the time regularization term expressing differences of the value of the property between this point and points of other restored images in the sequence which are associated to said point through the estimated displacements of the object with time; the space regularization term expressing differences of the values of the property between said points and neighbour points in a same restored image; and the measurements adequation term expressing differences between the measurements and projections of the restored images made in inverting the reconstruction process;

the values of the property at points of each restored image being modified in an iterative manner in order to progressively diminish a value or the error function for said restored image.

2. A process according to claim 1, wherein the displacements of the object are estimated with a model of the object.

3. A process according to claim 2, wherein the model is incompressible.

4. A process according to claim 3, wherein the object is a myocardium and the model consists of circular segments in a sectional plane and half elliptical segments extended by rectilinear segments in another sectional plane.

5. A process according to claim 1, wherein the images are tridimensional, the measurements are made on a bidimensional array of detectors and the reconstruction process is a backprojection of the measurements into a volume.

6. A process according claim 1, wherein the values of the property at points of each restored image are modified in calculating successive descent direction coefficients for each of the values at the points of said restored image, according to a gradient of the error function.

* * * * *